United States Patent Office 3,463,016
Patented Aug. 26, 1969

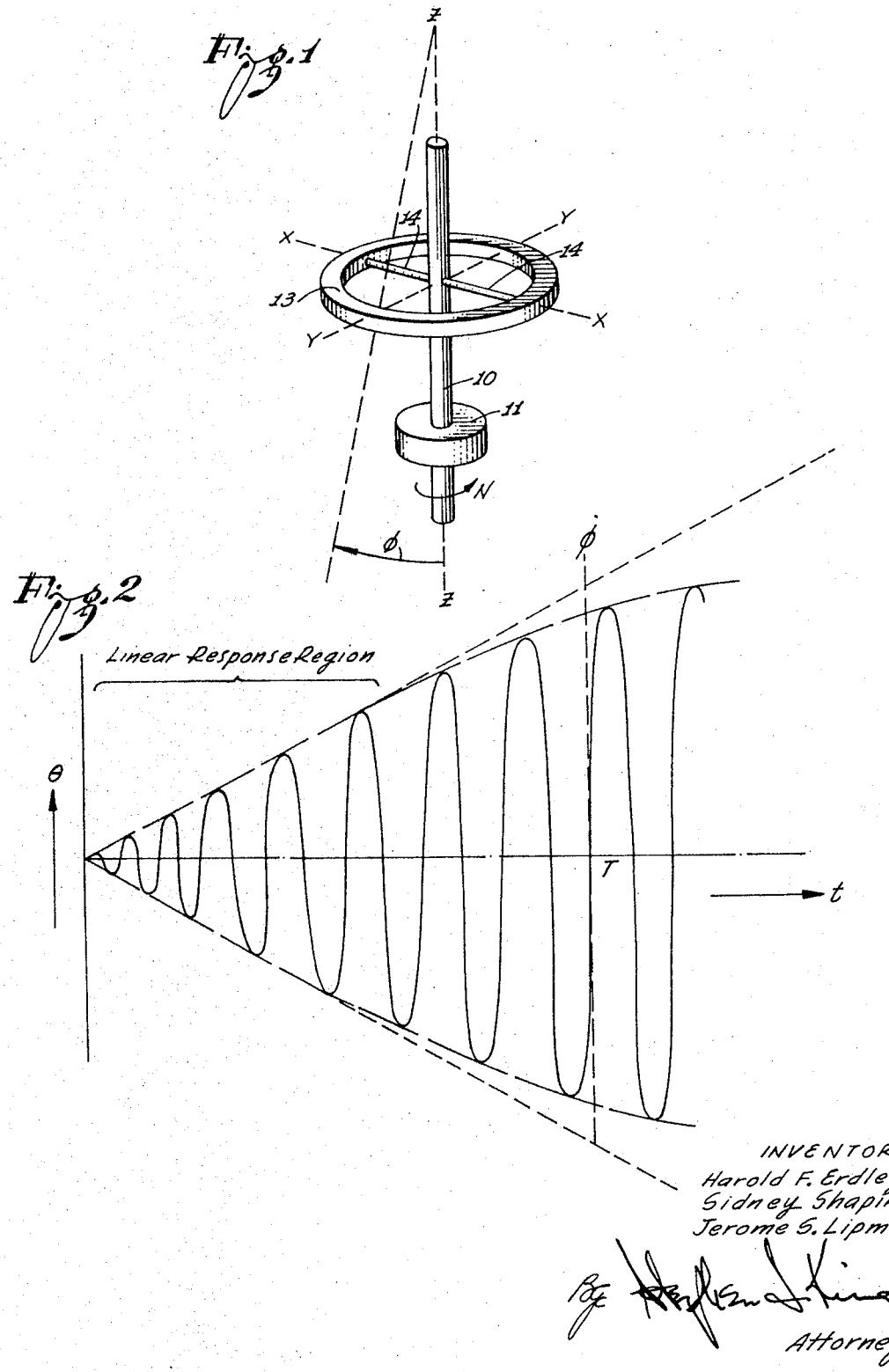

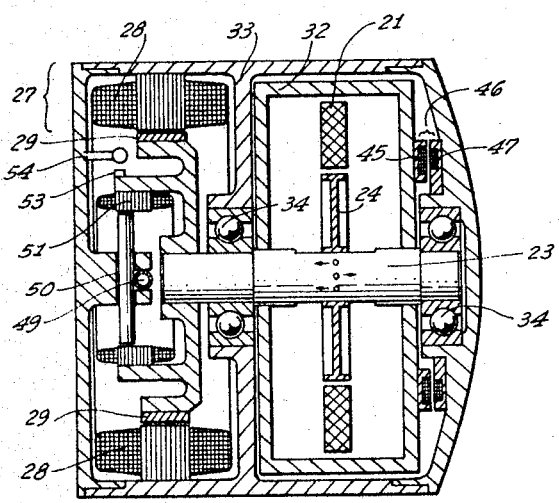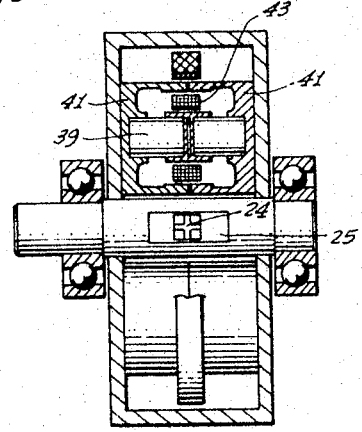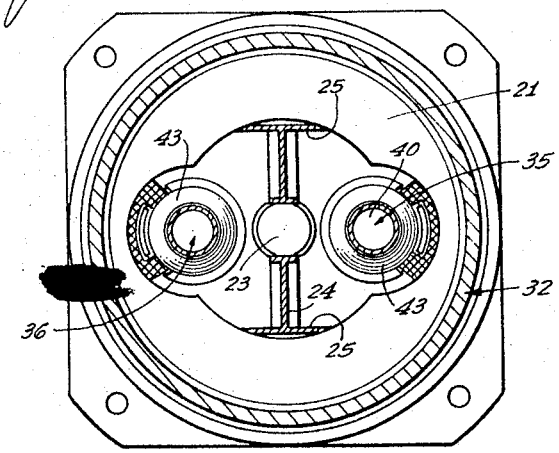

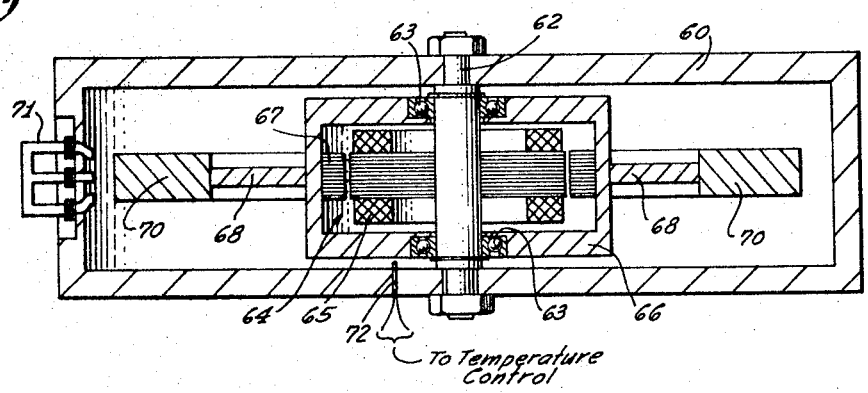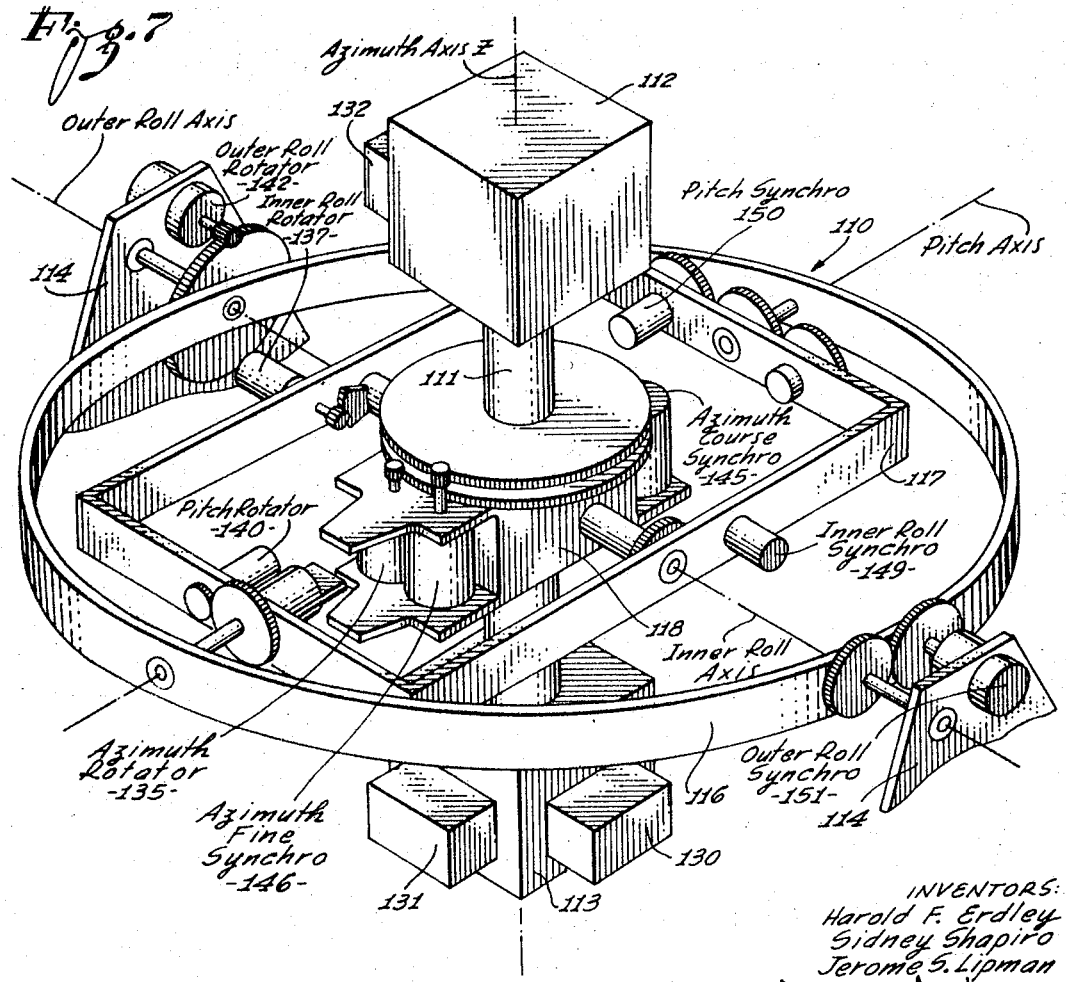

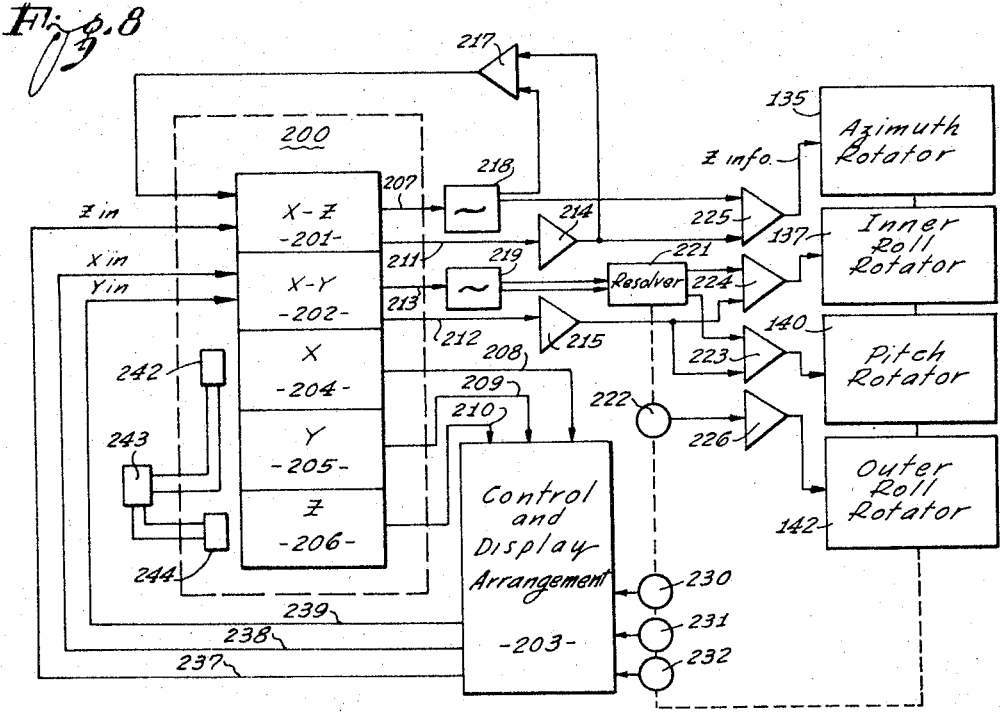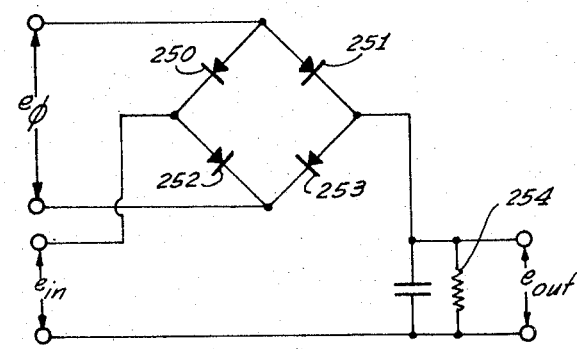

3,463,016
VIBRA-ROTOR GYROSCOPES
Harold F. Erdley, Jerome S. Lipman, and Sidney Shapiro, Los Angeles, Calif., assignors to Litton Systems, Inc., Woodland Hills, Calif.
Filed Nov. 15, 1963, Ser. No. 323,985
Int. Cl. G01c 19/54, 19/28
U.S. Cl. 74—5.4
30 Claims The present invention relates to a navigational system and more particularly to a stabilized platform inertial guidance system utilizing a unique inertial instrument to obtain an extremely low drift rate.

A stabilized platform system is a system used for precise inertial navigation. Such a system includes a so-called "stable element" to which acceleration measuring devices (accelerometers) are mounted for sensing vehicle accelerations along known coordinate axes. The stable element is maintained at a particular attitude relative to inertial space or to the earth (depending upon the mode of operation) by stabilizing devices. At the selected attitude of the stable element defined by the stabilizing devices, each of the accelerometers measures vehicle acceleration along one of the coordinates of the coordinate system of the selected attitude. By continuously integrating the particular accelerations detected by the accelerometers, the vehicle velocity and position relative to its starting point can be continuously determined.

Normally, the stabilizing devices utilized are especially accurate gyroscopes. In the recent years, an increasing amount of research effort has been devoted to the design and development of the gyroscopes utilized in inertial guidance platforms. Most of this effort has been directed toward reducing the rate (termed the "drift rate") at which the particular gyroscope drifts from a precisely accurate attitude. By using jewel, gas, and air bearings, by practicing particularly precise balancing techniques, by floating the internal elements, by using rare and expensive materials, and by practicing other techniques, all of which reduce stray torques, the claimed drift rate of conventional high accuracy gyroscopes has been substantially reduced. A guidance system using gyroscopes of presently attainable accuracy is capable of directing a vehicle quite close to a selected position after a journey of many thousand miles. Though this accuracy is sufficient for most purposes, some situations require even more accurate stabilizing devices.

Attempts to improve upon the accuracy now attainable with conventional gyroscopes have been, in general, unsuccessful due to the inherent characteristics of such devices. The accuracy of conventional displacement gyros (which provide an output directly indicative of a change of platform attitude) is limited by the complicated gimbal suspension system at which each such gyro must be supported. Each set of gimbals introduces bearing friction and imbalance problems. The accuracy of conventional gyros is also limited by torques exerted due to thermal gradients within the floatation fluid, due to gyro bearing accuracy, due to the fine conductors used within the floatation fluid for signal transmission, and by other stray torque producing elements.

Moreover, most of the changes made in gyroscopes to improve the drift rate have been at the expense of increasing complication and cost and of reducing ruggedness. At the same time, the environments to which modern vehicles containing inertial guidance platforms are being subjected, in general, are such as to require more rugged stabilizing instruments.

In view of the fact that gyro accuracy is substantially limited by gimbal-induced errors, investigators have cast about for ways to build gimbal-less stabilizing instruments. One such gimbal-less instrument is that described in U.S. Patent 1,801,619, issued Apr. 21, 1931, to E. Arrea. This instrument utilizes a vibrating bar to furnish an output signal which is used for controlling a North-seeking compass. A somewhat similar theory is the basis of the system of the present invention.

It is therefore a primary object of this invention to provide a stabilized platform system for inertial navigation more dependably accurate than any such system known to the prior art.

Another object of this invention is to mechanize an inertial guidance platform with stabilizing devices capable of imparting extremely small drift rates.

A further object of this invention is to provide a unique stabilizing device capable of more accurately positioning the stable element of a platform than can any stabilizing device present known.

An additional object of this invention is to reduce the complexity of stabilizing devices while increasing their accuracy, ruggedness, and ability to withstand severe environments.

A further object of this invention is to provide a unique device capable of indicating the angular changes in the attitude of a platform stable element which device is not subject to the normal error inducing torques inherent in conventional gyroscopes.

Yet another object of this invention is to utilize a unique integrating device with a novel system capable of compensating for angular changes to stabilize an inertial guidance platform in a selected coordinate system.

These and other objects are accomplished in accordance with the aspects of the invention by a novel platform system based upon a unique device which supplants the conventional gyroscope. Our platform system is capable of attaining an accuracy which is a complete order of magnitude more accurate than operative devices of the prior art. Such accuracy allows a vehicle to be placed within a few hundred yards of a preselected target half the world away from its take-off point. Moreover, the device which stabilizes our platform is less complicated, less costly, and substantially more rugged than known devices displaying substantially less accuracy.

Basically, the platform system centers about a unique inertial stabilizing device termed a "vibra-rotor" or "vibra-rotor gyroscope." It should be understood that the term "gyroscope" is used for lack of a better term because of the function the device fulfills, not because of its operating characteristics. Each vibra-rotor gyro has a rotating shaft which spins an inertial ring having torsionally restrained freedom about an axis perpendicular to the shaft. The vibra-rotor is designed so that the natural frequency of the inertia ring about the torsionally restrained axis is equal to the speed of shaft rotation. The ring is therefore very sensitive to motions at angles to the axis of the shaft. Such motions produce vibrations of the ring at its natural frequency which, if damping were eliminated, would continue indefinitely. The maximum amplitude of these vibrations is proportional to the angular motion of the shaft from its original position. Furthermore, the phase of the vibrations relative to the rotor rotational position is a direct measure of the direction of the input motion. Hence, the vibra-rotor may be used in place of a direct-reading, two-degree-of-freedom, integrating gyro.

In actual practice, though damping cannot be eliminated entirely, it can be reduced to the point that effects caused thereby occur, detectably, only after an extremely long period. More particularly, by placing the rotating elements within a vacuum enclosure, by selecting materials having minimal damping coefficients, and by the use of a substantially ring-shaped inertial element we have been able to reduce damping to a minimum. The configuration of the inertial element is of particular moment; we have found that a point and line symmetrical element, such as a substantially ring-shaped element, provides optimum moments of inertia for substantially eliminating the effects of mechanical damping as a controlling factor. Thus, in contradistinction to prior art vibratory devices, the vibra-rotor gyro is capable of extreme accuracy. When mechanized in a unique servo-mechanical platform system having a relatively rapid response, nearly perfect integrating gyro action with an extremely low drift rate (an order of magnitude better than conventional gyros) is realized.

Furthermore, since the device requires no gimbal mountings, it, generally, uses less parts susceptible of imbalance. The structure of the device is such that we have been able to eliminate the floatation fluid required with conventional gyroscopes. We have so constructed the device that an alternating-current signal is produced so that inductive torquers and pickoffs may be used and contact devices and torque-producing conductors are eliminated. All in all, in the vibra-rotor gyro, we have substantially reduced imbalances and stray torques and thereby increased the accuracy and the ruggedness of the device, relative to conventional, accurate gyroscopes. By combining such devices with a novel servo-mechanical system, as hereafter explained, an extremely accurate navigational system is realized.

The novel features which are believed to be characteristic of the invention, both as to its organization and method of operation, together with further objects and advantages thereof will be better understood from the following description considered in connection with the accompanying drawings in which several embodiments of the invention are illustrated by way of example. It is to be expressly understood, however, the drawings are for the purpose of illustration and description only and are not intended as a definition of the limits of the invention.

FIGURE 1 is a perspective drawing of a simple device illustrative of the principles of operation of vibra-rotor gyroscopes in accordance with the invention;

FIGURE 2 is a graphic illustration of deflection measured against time for the rotor element of a vibra-rotor gyroscope such as is shown in FIGURE 1 for a particular rotational input to the spin shaft;

FIGURES 3, 4, and 5 are partial side, front, and plan cross-sectional views, respectively, of a specific vibra-rotor gyroscope in accordance with the invention;

FIGURE 6 is a cross-sectional view of another specific vibra-rotor gyroscope in accordance with the invention;

FIGURE 7 is a perspective view of a platform in accordance with the invention;

FIGURE 8 is a block-schematic diagram of the circuitry and mechanics of a platform system in accordance with the invention; and FIGURE 9 is a schematic diagram of a demodulator circuit which may be used in the platform system of FIGURE 8.

In FIGURE 1 is shown a basic device in accordance with the invention which is believed to be useful in outlining the concepts involved. The device includes a rigid Cylindrical shaft 10 which may be mounted by bearings (not shown) and rotated about its axis by a conventional synchronous motor 11. A thin, ring-shaped rotor 13 constructed of a rigid material is mounted coaxially to the shaft 10 by a pair of colinear torsion bars 14 which attempt to maintain the rotor 13 in a plane perpendicular to the axis of the shaft 10. The torsion bars 14 are fabricated from a material and have a shape such that they are substantially rigid along their lengths and have a selected spring constant relative to rotations about their single axis caused by movements of the rotor 13.

If the shaft 10 is rotated about its axis at a constant spin rate N by the motor 11 and if the spring constant of the torsion bars 14 and the moments of inertia of the rotor 13 are selected such that the natural frequency of vibration of the rotor 13 about the bars 14 is equal to the spin rate N, the rotor 13 will be especially sensitive and will begin to vibrate in response to any angular rotation rate of the shaft 10 from its initial attitude. Furthermore, the point of maximum excursion of the rotor 13 in vibration will occur at an angle related to the direction of the change of attitude of the shaft 10. If the damping of the rotor vibrations is minimized, the excursion of the rotor 13 will increase linearly with the continued angular rotation of the shaft and will thus be representative, for some period, of the angular displacement of the shaft 10. The period of linearity will depend upon the amount by which the damping of the system can be minimized. During this period, the device illustrated in FIGURE 1 will function in a manner analogous to an integrating or displacement gyro and may be mechanized to provide an output representing the total angular displacement of the shaft 10.

A better appreciation of the operation of the device of the present invention and of the selections necessary in mechanizing the device to obtain the desired characteristics may be obtained from the following tentative mathematical analysis of its properties. As stated above, the response of the device to angular motion of the shaft 10 about any axis orthogonal to the shaft 10 is an alternating motion of the rotor 13 at a frequency equal to the spin frequency. The basic differential equation of motion for the device may be found from Euler's equation for the motion of a rigid body about a fixed point:

$$T_x = Aw_x - Aw_yw_z + Cw_yw_z$$

and from the equation for the torques due to the spring and damping constants of the bars 14:

$$T_x = -K\theta - D\dot{\theta}$$

where:

the $xyz$ axes are fixed in the rotor 13,
A is the transverse moment of inertia of the rotor 13 about the $x$ or $y$ axis,
$w_x, w_y, w_z$ are the respective angular rates,
C is the polar moment of inertia of the rotor 13 about the $z$ axis,
K is the angular spring constant of the torsion rods 14 about their common axis $x$, and
D is the angular damping constant of the torsion rods 14.

Equating the two and reducing, keeping in mind that:

$$w_x = \dot{\theta} + \dot{\phi} \cos Nt$$
$$w_y = \dot{\phi} \sin Nt + N\theta$$
$$w_z = N$$

where:

$\phi =$ the angular motion of the shaft 10 about an axis orthogonal to its initial axis, the following differential equation is obtained for the system:

$$CN\dot{\phi} \sin Nt = A\ddot{\theta} + D\dot{\theta} + [K + N^2(C-A)]\theta$$

It may be shown that at resonance:

$$A\ddot{\theta} = [K + N^2(C-A)]\theta$$

and $$w_R^2 = \frac{K + N^2(C-A)}{A}$$

where:

$w_R$ is the natural angular frequency of the rotor 13 when damping is small.

At resonance, $w_R = N$, so:

$$K = N^2(2A - C)$$

and the basic equation for the rotor becomes $$\ddot{\theta} + \frac{D}{A}\dot{\theta} + N^2\theta = \frac{C\dot{\phi}N^2}{A} \sin Nt$$

Solving the above equation assuming a constant input $\dot{\phi}$ $$\theta(t) = \frac{\dot{\phi}C}{D}(e^{-tT} - 1) \cos Nt$$

which reduces to $$\theta(t) = \frac{\dot{\phi}C}{D}\left(\frac{t}{T}\right) \cos Nt$$

where T = time constant and $t \ll T$.

The last equation demonstrates that for small angles $\theta$, the angular excursion of the rotor 13, is directly proportional to $\dot{\phi}t$, the angular excursion of the shaft, multiplied by a cosine term representing the vibrations. Thus, for periods small with respect to the time constant, $$T = 2A/D,$$

the device may be mechanized to function as a displacement gyroscope.

The linearity of the response of the rotor 13 to angular displacements of the shaft from an initial attitude is demonstrated by the graph of the response to a constant angular rate input $\dot{\phi}$ shown in FIGURE 2. As will be noted, for most of the period up to the time constant T, the slope of the envelope is extremely linear. If a network is provided for cooperating with the vibra-rotor in response to an output representing the envelope in a period short with respect to the time constant of the vibra-rotor, then a very accurate inertial navigation system may be realized.

From the equation for the time constant T above, one may recognize that the amount of damping materially affects the accuracy of the vibra-rotor gyroscope. By reducing this damping, we have attained a time constant of approximately three minutes in one embodiment of the vibra-rotor.

To determine the factors related to damping, we may define $Q_o$, the tendency of the rotor to vibrate when the shaft is not rotating, as:

$$Q_o = K/ND$$

Then $Q_e$, the tendency to vibrate when rotating, is:

$$Q_e = \frac{K + N^2(C - A)}{ND}$$

and $$Q_e = Q_o\left(\frac{A}{2A - C}\right)$$

at resonance

Since, for a thin rotor of mean radius R and thickness $h$, $$A = \frac{M}{2}\left(R^2 + \frac{h^2}{6}\right)$$

and $$C = MR^2$$

where M is rotor mass, $$Q_e = 3\left(\frac{R^2}{h}\right)Q_o$$

making the rotor as thin as possible, consistent with rigidity, is a desirable method of eliminating damping. In one particular embodiment, the $Q_e$ actually obtained was 71,000. It should be noted that the $Q_e$ of the circuit is greatly influenced by the shape of the inertial element since the moments of inertia depend on the shape. We have found the flat or thin ring shape to be most suitable in producing a $Q_e$ which allows the attainment of accuracies high in relation to those of the prior art.

In FIGURES 3, 4, and 5 are shown three views of a particular vibra-rotor gyroscope in accordance with the invention. The device shown has a rigid, essentially ring-shaped rotor 21 affixed perpendicularly to a rigid shaft 23 by a pair of torsional mounting bars 24. The bars 24 may be attached to the shaft 23 in a conventional manner, such as by high strength adhesives or by welding. The bars 24 are affixed to the rotor 21 by a pair of diaphragms 25, the purpose of which is explained below. The rotor 21, the shaft 23, and the bars 24 may be fabricated of a high strength material such as titanium; and the materials of all of these elements may be advantageously selected to have substantially identical coefficients of thermal expansion. In order to maintain the resonant frequency constant over a broad temperature range, "constant modulus" materials (having the combined coefficients of thermal expansion and thermal spring change substantially equal to zero) may be used. Thus, the bars 24 are constructed from a material (such as a nickel, chromium, iron material like "Ni Span C") and have a form such as will provide the desired spring constant over a wide range of temperatures. The bars 24 shown are of cruciform shape for a purpose to be explained below, but other shapes adapted to provide the appropriate spring constant with minimum damping may be used.

The rotor 21 is turned about the axis of the shaft 23 by a constant speed hysteresis motor 27. The motor 27 may be a synchronous motor of a form conventional to precision gyroscopes and comprises a stator 28 with appropriate stator windings thereon and rotor element 29. Input current is provided in a conventional manner from a source, not shown, to the windings of the stator 28. The rotor element 29 is mechanically attached to and drives the shaft 23 at a constant spin rate N selected to be equal to the natural frequency of vibration of the rotor 21 about the bars 24. The selective equilization of the rotor spin rate N and the natural frequency of vibration of the rotor 21 about the torsional mounting bars 24 is accomplished by adjusting the constants of the system in the manner outlined in the methematical analysis above.

A vacuum tight can 32 of closed-end, hollow cylindrical form may be advantageously mounted about the rotor 21 to rotate with and provide a high vacuum atmosphere for the vibration of the rotor 21. The high vacuum atmosphere ($10^{-3}$ mm. or mercury) within the can 32 (which may be constructed of magnetic shielding material such as a high nickel-content iron alloy) substantially eliminates any air damping of the vibrations of the rotor 21. The bars 24 are advantageously constructed of a material selected to have low creep and hysteresis characteristics in order to reduce mechanical damping to a minimum so that the total damping is reduced to an infinitesimal amount.

The shaft 23 is mounted to an outer casing 33, fabricated from a material such as beryllium, by a pair of shaft-supporting ball bearings 34, chosen to minimize the end play for the shaft 23. Alternatively, gas bearings may be used to lengthen instrument life; however, ball bearings provide substantially the same initial accuracy in the vibra-rotor. An inductive pickoff arrangement 35 and a physically-identical inductive torquing arrangement 36 are mounted within the vacuum can 32 to measure and to adjust, respectively, the deflection of the rotor 21 in its vibratory mode. Each of the pickoff and torquing arrangements 35 and 36 includes a pair of permanent magnets 39 affixed to rotate with the can 32 by a pair of magnetically-separated, field-shaping elements 41, arranged to present an appropriate preselected field. A coil 43 is affixed to the rotor 21 and moves within gaps in the field. In the vibra-rotor illustrated in FIGURE 5, the rotor 21 has material removed adjacent the arrangements 35 and 36 to balance the added coil weight.

In operation, a voltage is induced in the coil 43 proportional to the movement of the rotor 21. Since in the vibratory mode the maximum vibrational speed of the rotor 21 is directly proportional to its maximum deflection, the amplitude of the voltage induced by the vibration of the rotor 21 in coil 43 of the pickoff arrangement 35 is directly proportional to the maximum deflection of the rotor 21. Since maximum speed occurs at a position of the rotor 21 which is simply phase displaced from the position of maximum excursion, the phase of the voltage wave is indicative of the angle of maximum deflection. The induced voltage signal, thus, will indicate the angular displacement of the shaft 23. The pickoff signal generated by the coil 43 of the arrangement 35 is transferred to a rotating primary winding 45 of a rotary pickoff transformer 46 having a stationary secondary winding 47 by conductors (not shown) within the cam 32. These conductors are fixed to the rotor 21, the arms 24, the shaft 23, and the can 32 so that they do not induce stray torques in response to accelerations. The signal is further transferred to the secondary winding 47 to provide an output voltage signal indicative of rotor excursion.

The torquing arrangement 36, on the other hand, receives input signals from a unique torque generator mounted to cooperate with the rotor 29 of the spin motor 27. The torque generator receives direct-current torquing signals from a source, not shown, across a pair of primary windings 49 and 50, affixed in quadrature to each other and mounted to the outer case 33. A coil 51 is mounted to the rotor element 29 in close proximity to the coil 50 and rotates with the rotor element 29 to generate a torquing signal at a frequency exactly equal to that of the rotation of the shaft 23. One of the windings 49 or 50 receives torquing signals relating to a first coordinate (e.g., X-coordinate signals) while the other winding receives torquing signals relating to the other coordinate. Thus, the torquing signals are applied via the coil 43 of arrangement 36 in a sense always in such phase as to torque the rotor 21 in the desired direction.

Also connected to the container 33 is an output timing device comprising a permanent magnet 53 affixed to the rotor 29 of the motor 27 and a pickup coil 54 affixed to the outer case 33. As the rotor 29 spins, each revolution generates a pulse output signal across the pickup coil 54. The pulse output signals so generated may be utilized for phase resolution of the output signals generated by the pickoff arrangement 35. In specific arrangements, it may be desirable in order to enhance the accuracy of the system to use two or four such timing devices positioned, respectively, 180° to 90° from each other. Such signals may be used to accurately phase signal components in quadrature with one another. On the other hand, timing signals may also be furnished by more conventional alternating-current generating arrangements operated by the shaft 23 or in response to signals from the motor drive source, not shown. A benefit attendant on the use of the timing devices shown is that there is no phase synchronizing problem involved in operating two vibra-rotors together.

To recapitulate, in operation, the motor 27 drives the spin shaft 23 to rotate the rotor 21. In response to any angular motion of the case 33 and thus of the shaft 23 about an axis orthogonal to the axis of the shaft 23, the rotor 21 begins to vibrate. The maximum displacement of the vibration of the rotor 21, for a period depending on the instrument's time constant, is proportional to the rotation of the shaft 23. As the rotor 21 vibrates, the speed of its vibratory movement about the torsion bars 24 is measured by the pickoff arrangement 35. The measurement appears as a sinusoidal voltage signal across the secondary winding 47 of the rotary pickoff transformer 46. When desired (for initial platform setup or for other reasons), torquing signals are applied via the torquing arrangement 36 to damp out and null the vibrations of the rotor 21, or to provide desired precessional rates for the vibra-rotor stabilized platform.

The form of the torsion bars 24 of the device shown in FIGURES 3, 4, and 5 should be clearly noted. In cross section the bars 24 are of cruciform shape. This shape is selected in order to provide maximum transverse strength while presenting a small elastic constant and thus minimizing hysteresis losses within the material of which the torsion bars 24 are constructed. However, though damping is substantially reduced so that the time constant of vibration of the rotor 21 is increased and a concomitant increase in accuracy of the system is realized, another problem must also be solved. This problem involves an error (an isoelastic drift) of a second order of magnitude which is caused by sudden acceleration changes which introduce high G forces on the device. Since the inertial ring is suspended by an arrangement which is not symmetrical in all directions, the application of high G forces to the ring may cause a shift in the center of gravity which will place a stray torque on the inertial ring and introduce drift error into the operation of the associated platform system. However, if substantially symmetrical suspension is provided, a shift in the center of gravity will cause no stray torques to be applied and no drift will occur.

In the arrangement shown in FIGURES 3, 4, and 5, the cruciform shape of the torsion bars 24 is such that its flexure characteristic (stiffness) in response to a shift of the center of gravity of the inertial ring 21 in any direction perpendicular to the axis of the bars 24 is substantially uniform. However, substantially greater stiffness is encountered by forces applied in a manner such as to shift the center of gravity in any direction which has a component lying along the axis of the torsion bars 24 because of the resistance of the torsion bars 24 to compression along their axis. To balance this increased stiffness and more uniformly suspend the inertial ring 21, a pair of diaphragms 25 are provided at the outer extremities of the torsion bars 24 for mounting the inertial ring 21. The stiffness of the diaphragms to movements perpendicular to their parallel planes is selected such that the total is substantially equal to the stiffness of the torsion elements to movements perpendicular to their axis. Thus, a substantially symmetrical suspension is realized; and isoelastic drift is substantially eliminated.

In FIGURE 6 is shown another embodiment of the vibra-rotor gyroscope of this invention. The device shown comprises an outer case 60 in the form of a pressure-tight, hollow cylinder with closed ends which is preferably constructed of a light, but rigid, material such as aluminum. The axis of the case 60 and the axis of a spin shaft 62, preferably of a rigid material such as stainless steel, are coaxial. Mounted to the shaft 62 is a conventional gyroscope motor 64. The motor 64 may be a synchronous hysteresis motor of a type well known to the art in which field generating coils 65 are positioned by a central stator while a motor casing 66 mounts pole pieces 67 and is driven to rotate on ball bearings 63 about the coils 65. Mounted to the motor casing 66 by a pair of torsion bars 68 is an inertial ring 70. The casing 66 serves as a shaft for rotating ring 70.

As pointed out above, the inertial ring 70 is constructed of a rigid material such as a selected iron or steel. Alternatively, an iron or steel band may be provided surrounding a central rigid material, such as titanium. The bars 68 may also be constructed of a rigid material and be of a form such as to provide a preselected spring constant. In a particular embodiment of the vibra-rotor gyroscope shown in FIGURE 6, the inertial ring 70 was constructed of iron, had a weight of 104.8 grams, and had inner and outer diameters of 2.5 and 3.25 inches respectively. The torsion bars 68 were selected to provide a spring constant of 2.71 inch pounds per radian. As explained, these values were chosen in view of the constants of the circuit, including the speed of rotation of the spin motor 64 (approximately 141 r.p.s., in the particular arrangement). The device shown was provided with a conventional pickoff arrangement 71 fixed to the outer case 60 for measuring vibrations of the rotor 70. Varying fields are generated in each half of the E-type arrangement 71 in a conventional manner by the movement of the iron in the rotor 70 to provide A-C output signals on conductors (not shown). The E-type arrangement 71 may also be used for generating fields due to rotation-phase signals and torquing signals (explained below) or another like arrangement may be added. It should be noted that like pickup and torquing arrangements could be mounted to the rotating cam 32 of the device shown in FIGURE 3.

The definite advantages of the arrangements shown in FIGURES 3, 4, 5, and 6 which accrue due to the use of a vacuum-tight enclosure for the rotor should be noted. First, the use of the vacuum-tight enclosure allows a reduction of atmospheric pressure to the point where air damping is not a factor in the time constant of the instrument. The vacuum enclosure allows close control over the characteristics of the atmosphere surrounding the rotor, the most important element of the instrument and the only element the balancing of which is critical. For example, the temperature of the can may be sensed by a temperature sensing device 72 of any compatible well known type. The device 72 may be arranged to provide signals to temperature control devices, not shown, which control the atmosphere surrounding the devices to remain relatively constant. Since no balancing fluids are contained with the vacuum enclosures, no thermal gradients arise and materials may be chosen without the overriding necessity of so closely balancing their thermal expansion characteristics.

A number of additional advantages accrue due to the basic form of the vibra-rotor gyroscope. For example, the rotor is the only element which requires balancing to the degree normal to like precision instruments so fabrication is greatly simplified. Moreover, stray bearing torques which do occur are not transferred to the output. Only bearing end shake affects the rotor, and this appears simply as an easily-filtered bias level in the output of the instrument. Not only are the above-mentioned advantages realized, but because of the response of the rotor to actual movements of the spin shaft, the vibra-rotor is mounted directly to the stable element without a gimbal system. Without a gimbal system and the attendant stray gimbal torques, accuracy is substantially increased and drift rate is reduced.

In FIGURE 7 is shown a stabilized platform generally designated 110. The platform 110 includes a stabilized element 111 on which are mounted two attitude-determining vibra-rotor gyroscopes (not shown but directly mounted to the interior of enclosing boxes 112 and 113, respectively, which are affixed to stabilize the element 111 with spin axes at right angles to each other). The vibra-rotor gyros are aligned to define a set of coordinate axes so that the element 111 is maintained at a fixed attitude or orientation in space. In other words, the vibra-rotors supply an inertial reference to which the element 111 is slaved. By means of pickoffs intercoupling the vibra-rotors and the element 111, any rotational displacements of the element 111 about the selected coordinate axes are immediately detected and the element 111 is rotated with respect to a reference frame 114 in a manner to eliminate the displacements. Thus, the element 111 is continuously stabilized in inertial space (or in any desired coordinate system by means of torquing) so that it maintains the fixed attitude defined by the vibra-rotors.

It will be understood that in operation the reference frame 114 is ordinarily fixedly mounted in a vehicle, the element 111 then being utilized as an attitude reference from which the instantaneous attitude of the vehicle can be determined. Moreover, if the accelerations of the vehicle are to be continuously integrated to determine the velocity or position of the vehicle, the necessary accelerometers 130, 131, and 132 will be mounted on the stable element 111 to detect accelerations along the known coordinate axes defined by the vibra-rotors and maintained by the element 111.

In order that the stable element 111 may be rotated with respect to the reference frame 114, the element 111 is mounted in a four-axis gimbal suspension system which comprises an outer gimbal 116, an intermediate gimbal 117, and an inner gimbal 118. The element 111 is continuously maintained at the fixed attitude defined by the vibra-rotor gyroscope through coordinated rotations of the gimbals 116, 117, and 118 about the outer roll, pitch, and inner roll axes, respectively, and by the rotation of the element 111 (the so-called "azimuth gimbal") about the azimuth axis. As indicated in FIGURE 7, an azimuth rotator 135 (which may be a conventional servo-motor or other actuator), an inner roll rotator 137, a pitch rotator 140, and an outer roll rotator 142, are mounted to the gimbal system to rotate the gimbals 116, 117, and 118. Upon appropriate electrical energization of any of the rotators 135, 137, 140, and 142, rotation about the corresponding platform axis will be effected.

The above-described mechanism also includes equipment for electrically detecting and indicating rotations of the gimbals and of the element 111 relative to each other. For example, azimuth rotation is picked off by an azimuth coarse synchro 145 and an azimuth fine synchro 146. An inner roll synchro 149 indicates the rotation of the gimbal 118 about the inner roll axis, a pitch synchro 150 indicates the rotation of the intermediate gimbal 117 about the pitch axis, and an outer roll synchro 151 indicates the rotation of the outer gimbal 116 about the outer roll axis. A more complete description of a four axis platform is contained in U.S. Patent 2,949,785, issued Aug. 23, 1960, to Singleton and Erdley.

Further understanding of the manner in which the platform system of this invention operates may be gained by referring to FIGURE 8. In FIGURE 8 is shown an inertial navigation platform system in accordance with the present invention. In the format of FIGURE 8 both the electronic and mechanical connections and couplings are illustrated where pertinent to the description of the operation of the system. The system includes a stable element 200 upon which are mounted first and second vibra-rotor gyros 201 and 202 which determine the attitude of the XZ and XY axes of the stable element 200, respectively. Also mounted upon the stable element 200 are three accelerometers 204, 205, and 206. Each of the accelerometers measures acceleration in a particular direction with respect to an initial attitude of the stable element 200 and provides an output representative of the particular acceleration. The output signals generated by the accelerometers 204, 205, and 206 are transferred via a number of conductors (illustrated by paths 208, 209, and 210) to a control and display arrangement 203, such as a computer capable of the calculations necessary for determining the distance traveled and other factors relative to the vehicle upon which the accelerometers are placed.

Each of the vibra-rotor gyros 201 and 202 has a pickoff arrangement (not shown) such as that described above with respect to FIGURES 4, 5, and 6 for deriving information regarding the vibration of its rotor. The output signals from the pickoff arrangements are transferred via conductors 211 and 212 to one of a pair of conventional alternating-current amplifiers 214 and 215. After amplification the signals are transferred to a plurality of demodulators where components indicative of the magnitude of the output signals along a particular coordinate are generated.

To accomplish the reduction of the signals to their components along the particular axes, signals indicative of the rotational phase of the rotor of each vibra-rotor are generated and directed to each of the demodulators. The phase signals may be generated in a well known manner by square-wave generators or sine-wave generators. In FIGURE 8 are shown a pair of sine wave generators 218 and 219 tuned to generate output waves at a frequency substantially identical to rotor spin frequency. The generators 218 and 219 may comprise one-shot multivibrators, for example, operated in response to timing pulses transferred on conductors 207 and 213 indicating spin phase of the rotors, such as signals generated by the timing pulse generator shown in FIGURE 3. Each of the generators 218 and 219 also includes a well known means (such as a phase shifting network) for producing a second output signal displaced in phase by 90° from the original. Thus, each generator 218 and 219 produces a pair of phase signals in quadrature with each other. It should be here noted that the generation of signals indicative of the phases of operation of both vibra-rotors eliminates any need to synchronize the motors of the vibra-rotors. If other phasing signals are used than those derived by the generator shown in FIGURE 3, the generators 218 and 219 are suitably modified in a well-known manner to generate signals in quadrature.

Since the X-axis-rotation signal generated by the vibra-rotor gyro 201 is redundant to that generated by the gyro 202, the X component of the output signal of gyro 201 is derived by a demodulator 217 and fed back to cage the gyro 201 in its X rotation to the stable element 200. In this manner, the stable element 200 is controlled in X rotation entirely by the vibra-rotor gyro 202. Alternatively, means might be provided for averaging the two X-component signals produced by the vibra-rotor gyros 201 and 202 to furnish an output signal dependent on both vibra-rotor output signals. Such an averaging arrangement is described in the system disclosed in the Erdley and Singleton patent, mentioned above.

Two things should be noted in regard to the demodulation of the X-component of the signal produced by the gyro 201. First, since the attitude of the stable element 200 is defined by the gyros 201 and 202, it is not necessary to phase shift the X-component signal fed back to the gyro 201 to gang it to the stable element 200. This is not true of the signals generated for operating the roll and pitch gimbals, as will be explained. The second item of note is the manner in which the proper signal component is derived. In FIGURE 9 is shown a demodulating circuit which may be used to derive the particular component desired for example, the X-rotation component for feedback to the gyro 201. The circuit of FIGURE 9 includes four diodes 250–253 arranged to receive the controlling phase signal $e_\phi$ and the signal $e_{in}$ of which a particular component is desired and to present the desired output signal $e_{out}$ across an output arangement illustrated by a load resistor 254. The phase signal $e_\phi$ is large with respect to the signal $e_{in}$ so that current flows to the resistor 254 only in proper phase with the signal $e_\phi$. Thus, the signal $e_{out}$ derived from the signal $e_{in}$ is only that component thereof in phase with $e_\phi$.

The signal from the amplifier 214 is also transferred to a demodulator and azimuth servo amplifier 225 (including circuitry like that shown in FIGURE 9) which derives the component of azimuth information and transfers that information to operate an azimuth rotator 135. The demodulator and amplifier 225, like the others mentioned hereafter, includes in addition to demodulator circuits a conventional servo amplifier. At least one of the vibra-rotor output axes is generally aligned with the azimuth of the platform so no phase shift of the signal generated by the generator 218 is necessary.

On the other hand, the X and Y coordinates of the gimbals are aligned with the vehicle and vary therewith while the X and Y coordinates of the stable element 200 remain fixed in inertial space (or with respect to local vertical). Thus, the X and Y signals derived with reference to the stable element coordinate system must be phase shifted before application to the gimbal system. To accomplish this, the two, phase output signals of the generator 219 are directed to a resolver 221. The resolver may be of a type having a pair of primary windings arranged in quadrature and a pair of rotating secondary windings also arranged in quardature, the position of the secondary windings being mechanically controlled by the azimuth gimbal of the stable element 200. Such a resolver is illustrated in FIGURES 8–23 at page 141 of "Principles of Guided Missile Design," edited by G. Merrill, published 1962 by D. Van Nostrand Company. Such a resolver generates output signals related to the input signals as follows:

$$E_{o1} = E_{in1} \cos \theta - E_{in2} \sin \theta$$
$$E_{o2} = E_{in1} \sin \theta + E_{in2} \cos \theta$$

The phase-shifted reference signals generated by the resolver 221 are directed respectively to a demodulator and pitch servo amplifier 223 and to a demodulator and inner roll servo amplifier 224. The demodulator-servo amplifiers 223 and 224 function (e.g., as illustrated in FIGURE 9) to provide output signals for controlling the rotators 140 and 137 associated with the pitch and inner roll gimbals, respectively. Finally, a signal is provided by an inner roll synchro 222 which indicates the position of the inner roll gimbal. This signal is transferred to an outer roll servo amplifier 226 to provide a signal for operating the outer roll rotator 142 to drive it to the appropriate position so that gimbal lockup will not occur. The method of accomplishing the feedback between inner and outer roll gimbals is well illustrated in the above cited Erdley and Singleton patent.

Also included and mechanically connected (as demonstrated by the dotted lines) to the outer roll gimbal, the pitch gimbal, and the azimuth gimbal, respectively, are synchros 230, 231, and 232 which generate output signals representative of the platform roll, pitch, and true heading in a manner well known in the art. These signals are transferred directly to the associated control and display arrangement 203 where they are utilized to indicate present attitude and directional heading.

The original position of the stable element 200 and any changes in position required due to operation in the local vertical mode are controlled by signals transferred from the arrangement 203 to the vibra-rotor gyos 201 and 202 via conductors 237, 238, and 239. These signals are transferred to the torquing arrangements of the individual gyros 201 and 202, such as the torquing arrangement shown in FIGURES 3, 4, and 5.

It should be noted that a temperature sensing device 242 may be arranged on the stable element 200 to transfer signals to a temperature control device 243. The device 243 may be conventional in form and operate an element 244 to maintain the temperature of the element 200 substantially constant and eliminate the need for precisely maching temperature coefficients of expansion within the vibra-rotor gyros. Some form of shock ("irrotational") mount may also be associated with the platform system shown in FIGURE 8 to damp external vibrations at the natural frequency of the rotor. These mounts are well know, fit between the platform and the vehicle, and mechanically damp vibrations which might interfere with operation of the system.

From the above description, it is clear that the platform system of this invention provides more accurate, more rugged, and less expensive inertial guidance than any system known to the prior art. Obviously, numerous modifications and alterations might be made in the system of the invention without departing from the basic concepts. Accordingly, the invention is to be limited only by the spirit and scope of the appended claims.

What is claimed is:

1. An inertial navigation platform system comprising a stabilizable element; a reference frame; means rotatably supporting said stabilizable element with respect to said reference frame; means for determining the attitude of said stabilizable element relative to said frame; means for adjusting the attitude of said stabilizable element relative to said frame; a pair of stabilizing elements each comprising a spin motor, a spin shaft driven by said motor, an inertial element torsionally mounted to said shaft in a manner such that vibrations of said inertial element are proportional to rotations of the spin shaft from its initial position, and means for providing signals representing vibrations of the inertial element; a source of timing signals proportional to the rotation of the shafts of said pair of stabilizing elements; and means operative in response to signals generated by said source of timing signals and to signals representing vibrations of the inertial elements for operating said means for adjusting the attitude of said stabilizable element.

2. An instrument for determining rotational displacements comprising in combination a shaft, an inertial ring, torsional suspension means mounting said ring coaxially to said shaft in the unstressed position of said torsional suspension means, said ring and said suspension means determining the natural frequency of oscillation of said ring, means for spinning said shaft about its axis at a rate equal to the natural frequency of oscillation of said ring, means for providing a low pressure atmosphere surrounding said ring, means mounted to said ring for determining the oscillations of said ring, and inductive means for applying a torque to damp oscillations of said ring.

3. An inertial platform system comprising in combination a stable element, a pair of stabilizing devices each mounted to said stable element and including an inertial element capable of rotation about an axis defining a preselected attitude, each of said stabilizing devices providing an alternating-current output signal indicative of changes about any axis perpendicular to said axis; means for resolving said output signals into components related to a second attitude; a platform capable of being fixed to a vehicle for defining said second atitude; a gimbal system for suspending said stable element in relation to said platform; means for detecting the position of said gimbal system; and means for moving said gimbal system to maintain said stable element at said preselected attitude.

4. An instrument for providing signals indicative of angular changes from predetermined attitude comprising a shaft, means for spinning said shaft at a preselected rate about its axis, an inertial ring, torsional restraining means for mounting said ring concentric to said shaft such that said ring has a natural frequency of oscillation about said torsional restraining means substantially equal to said preselected rate, means affixed for rotation with said shaft for providing a controlled atmosphere in the region of vibration of said ring; means for providing a magnetic field in a preselected region within said controlled-atmosphere-providing means; and means on said ring for sensing said magnetic field.

5. An inertial navigation instrument comprising a rotating shaft, a rotor of rigid material, torsion spring means for mounting said ring in a plane perpendicular to the axis of said shaft for limited torsionally-restrained substantially undamped movement about a single axis lying in said plane, means for detecting oscillations of said ring about said single axis, said shaft being designed to be driven at an angular rate substantially equal to the undamped natural frequency of oscillation of said ring about said single axis.

6. An inertial navigation instrument comprising a shaft, means for rotating said shaft at a preselected constant rate N, a thin substantially ring-shaped inertial element, torsional restraining means for mounting said inertial element to have limited, substantially undamped, vibratory movement about an axis perpendicular to the axis of said shaft at a frequency substantially equal to said constant rate N, and means for detecting the vibratory movements of said inertial element.

7. An inertial navigation instrument as claimed in claim 6 in which said torsional restraining means comprises a pair of torsion bars having collinear axes intersecting the axis of said shaft at opposite sides thereof, and means for affixing said torsion bars to said shaft and said inertial element to provide substantially similar stiffness in all directions.

8. An inertial navigation instrument comprising a shaft, means for rotating said shaft at a preselected constant rate, a thin substantially ring-shaped inertial element, a pair of torsion bars having collinear axes intersecting the axis of said shaft at opposite sides thereof, a pair of diaphragms, each affixed to said inertial element and affixed normal to one of said torsion bars, said diaphragms having a selected stiffness characteristic, said inertial element having limited vibratory movement about said collinear axes at a frequency substantially equal to said constant rate, and means for detecting the vibratory movements of said inertial element.

9. An inertial navigation instrument comprising a shaft, means for rotating said shaft at a preselected constant rate, a thin, substantially ring-shaped inertial element, torsional restraining means for mounting said inertial element to have limited vibratory movement about an axis perpendicular to the axis of said shaft at a frequency substantially equal to said constant rate, means for detecting the vibratory movements of said inertial element, and means for maintaining a high vacuum atmosphere in the region surrounding said inertial element.

10. An inertial instrument as claimed in claim 9 in which said vacuum-atmosphere-maintaining means comprises a hollow vacuum-tight cylinder enclosing said inertial element and fixed to rotate with said shaft.

11. An inertial instrument as claimed in claim 10 in which said detecting means comprises inductive pickoff means, a rotary transformer having a primary winding mounted to said cylinder, and means for transferring signals from said pickoff means to said primary winding.

12. An inertial instrument as claimed in claim 11 in which said pickoff means comprises means affixed to said cylinder for producing a magnetic field, and a winding affixed to move with said inertial element in said field.

13. A vibra-rotor comprising a shaft, an undamped inertial ring, a pair of collinear torsion bars mounting said ring coaxially with said shaft, means including said bars and a motor having an outer casing fixed to said bars and arranged to revolve about said shaft for rotating said ring about the axis of said shaft at an angular rate substantially equal to the undamped natural frequency of oscillation of the ring, and pickoff means for detecting movements of said ring.

14. A vibra-rotor as claimed in claim 13 comprising an outer container mounting said shaft and surrounding said ring; and at which said inductive pickoff means comprises magnetic field means affixed to said container.

15. An inertial navigation instrument comprising a shaft, a thin inertial element having substantially point and line symmetry about said shaft, means for rotating said inertial element about said shaft at a preselected constant rate, said rotating means including torsional restraining means for mounting said inertial element to have limited vibratory movement about an axis perpendicular to the axis of said shaft at a frequency substantially equal to said constant rate, means for detecting the vibratory movements of said inertial element, a hollow vacuum-tight cylinder enclosing said inertial element and fixed to rotate with said shaft, and means for applying torques to said inertial element to null the vibratory movements thereof.

16. An inertial navigation instrument as claimed in claim 15 in which said torque-applying means comprises means affixed to said cylinder for generating a fixed field, and means affixed to said inertial element for generating a field in response to torquing signals.

17. An inertial navigation instrument as claimed in claim 16 further comprising first and second primary windings arranged in quadrature, means for applying direct-current signals indicative of the torquing force required in a particular coordinate to a selected one of said windings, a secondary winding affixed to revolve with said shaft, and means for furnishing signals from said secondary winding to said means for generating a field in response to torquing signals.

18. An inertial guidance platform comprising a stable element, a gimbal system for supporting said element at a particular attitude, a pair of vibra-rotors affixed to said element in a manner to provide three-coordinate sensitivity to changes of said element from said attitude, means for detecting vibrations produced by each of said vibra-rotors, and means for operating said gimbal system to null detected vibrations of said vibra-rotors.

19. An inertial guidance platform comprising, in combination:
a stable element;
means for supporting said stable element relative to a reference frame;
first and second gimbal-less inertial stabilizing means affixed to said stable element for determining an inertial attitude for said stable element, each of said first and second stabilizing means comprising
a shaft,
a thin rigid inertial element,
torsion spring means for mounting said inertial element perpendicular to the axis of said shaft for limited, substantially undamped, torsionally-restrained movement about a single axis perpendicular to the axis of said shaft,
means for detecting oscillations of said inertial element about said single axis,
each of said stabilizing means being characterized by its said inertial element having substantially equal moments of inertia A about any two axes in a plane perpendicular to the axis of its said shaft and a moment of inertia C about the axis of its said shaft, its said torsion spring means having a torsion spring constant K, its said shaft and inertial element being rotated about the axis of its said shaft at an angular rate N, and K being equal to $N^2(2A-C)$.

20. An inertial navigation system comprising, in combination, a stable element, means for supporting said stable element at a particular attitude relative to a reference frame, first and second gimbal-less inertial stabilizing devices affixed to said element in a particular coordinate relation therewith, means for deriving a single alternating-current signal from each of said stabilizing devices indicative of angular changes in attitude of said stable element, means for deriving reference signals from said stabilizing devices, means for resolving the reference signals derived from one of said stabilizing devices into components related to said reference frame, and means responsive to said components of said reference signals and said angular-change-indicative signals for causing said supporting means to maintain said stable element at said particular attitude.

21. A navigation system comprising a stable element; a pair of vibra-rotors mounted with orthogonally-aligned spin axes to said stable element, each of said vibra-rotors including a rotor torsionally mounted to vibrate in response to changes in attitude of said stable element, and means for generating an alternating-current signal indicative of vibrations of said rotor; mounting means for arranging said stable element at a particular attitude; means for deriving signals from said vibration-indicative signals to align said stable element at said particular attitude; and means for operating said mounting in response to said last-mentioned signals.

22. An inertial guidance platform for maintaining an object at a particular attitude comprising, in combination, a stable element, a frame fixed to the object, a gimbal set for supporting the stable element in the frame, a plurality of rotators for causing the gimbal set to align the stable element at the particular attitude, a plurality of synchros for detecting the attitude of the gimbal set, a plurality of accelerometers mounted to the stable element to measure accelerations along coordinates of the particular attitude, a stabilizing device fixedly mounted to the stable element having a shaft and an inertial element arranged to rotate about the shaft, a torquing device for aligning the stabilizing device to define the particular attitude, and means for providing an alternating-current signal representing deviations of the stabilizing device from the position defining the particular attitude.

23. An inertial guidance platform comprising, in combination, a mounting element, a gimbal system for supporting the mounting element relative to a vehicle, means for actuating the gimbal system to align the mounting element at a particular attitude in inertial space, means for determining the attitude of the gimbal system, a plurality of accelerometers supported by the mounting element to measure accelerations along coordinate axes in quadrature, a pair of torsionally-restrained inertial elements rotatable about axes fixed in relation to the mounting element and in quadrature to each other, means for producing A-C signals representing the vibratory motions of each of the pair of inertial elements.

24. A system for maintaining an object at a particular attitude comprising, in combination, a stable element, a frame fixed to the object, a gimbal set for supporting the stable element in the frame, a plurality of rotators for causing the gimbal set to align the stable element at the particular attitude, a plurality of synchros for detecting the attitude of the gimbal set, a plurality of accelerometers mounted to the stable element to measure accelerations along coordinates of the particular attitude, a stabilizing device fixedly mounted to the stable element having a shaft and an inertial element arranged to rotate about the shaft, a torquing device for aligning the stabilizing device to define the particular attitude, means for providing an alternating-current signal representing deviations of the stabilizing device from the position defining the particular attitude, means for amplifying alternating-current deviation signals provided, means for deriving signals representing the phase of rotation of the shaft of the stabilizing device, a resolver circuit including a primary winding connected to receive the phase signals and a rotatable secondary winding coupled to the primary winding and rotated by the gimbal set, and demodulator means operated in response to resolved phase signals appearing across the secondary winding and the amplified deviation signals for operating the rotators.

25. A vehicle stabilization system comprising, in combination, a mounting element, a gimbal system for supporting the mounting element relative to a vehicle, means for actuating the gimbal system to align the mounting element at a particular attitude in inertial space, means for determinating the attitude of the gimbal system, a plurality of accelerometers supported by the mounting element to measure accelerations along coordinate axes in quadrature, a pair of torsionally-restrained inertial elements rotatable about axes fixed in relation to the mounting element and in quardature to each other, means for producing A-C signals representing the vibratory motions of each of the pair of inertial elements, means for providing signals representing the phase of rotation of each of the pair of inertial elements, means for resolving at least one rotational phase signal into components related to the attitude of the gimbal system, and means for operating said gimbal-system-actuating means in response to the A-C signals and the phase representative signals.

26. An inertial guidance instrument comprising an inertial element having substantially point and line symmetry with respect to an axis; and means for rotating the inertial element about said axis including a shaft concentric with said axis, and torsional restraining means mounting said inertial element to said shaft for limited movement about said restraining means, said torsional restraining means having a spring constant and said inertial element a mass and configuration such that angular displacements of said shaft are directly proportional for a substantial period to the vibrational excursion of said inertial element.

27. An inertial instrument comprising a shaft, means for rotating said shaft about its axis at a constant rate, a pair of collinear cruciform torsion bars fixed at right angles to said shaft, an inertial element of closed hollow form, and a pair of diaphragms of selected stiffness each mounted at opposite ends of said bars normal thereto and mounting said inertial element.

28. An inertial instrument comprising an inertial element capable of rotation about a first axis and a vibration about a second axis angularly disposed with respect to said first axis, means for rotating said inertial element at an angular frequency substantially equal to the undamped natural angular frequency of vibration of said element, means for sensing the vibratory motion of said inertial element, and substantially evacuated means rotating with an enclosing said inertial element to maintain said inertial element in a substantial vacuum.

29. An inertial instrument comprising an inertial element capable of rotation about a first axis and an undamped vibration about a second axis angularly disposed with respect to said first axis, motive means, including a pair of torsion bars having their torsion axes along said second axis and diaphragms interposed between and connecting said torsion bars and said inertial element, for rotating said inertial element about said first axis at an angular rate which equals the undamped natural frequency of oscillation of said inertial element about said second axis.

30. The inertial element instrument of claim 29 wherein the stiffness of the diaphragms to movements perpendicular to their parallel planes is chosen to be substantially equal to the stiffness of the torsion bars to movements perpendicular to their axes.

References Cited
UNITED STATES PATENTS

| | | | |
|---|---|---|---|
| 3,367,194 | 2/1968 | Diamantides | 74—56 |
| 2,991,659 | 1/1961 | Bowden | 74—5 X |
| 2,995,938 | 8/1961 | Brodersen et al. | 74—5 X |
| 3,077,785 | 2/1963 | Stiles | 74—5 |
| 3,211,011 | 10/1965 | Litty | 74—5 |

FRED C. MATTERN, JR., Primary Examiner

MANUEL ANTONAKAS, Assistant Examiner

U.S. Cl. XR.

74—5.6